United States Patent
Kim et al.

(10) Patent No.: US 10,074,850 B2
(45) Date of Patent: Sep. 11, 2018

(54) HIGH-CAPACITY NEGATIVE ELECTRODE ACTIVE MATERIAL AND LITHIUM SECONDARY BATTERY INCLUDING THE SAME

(71) Applicants: LG Chem, Ltd., Seoul (KR); Seoul National University R&DB Foundation, Seoul (KR)

(72) Inventors: Jihyun Kim, Daejeon (KR); Jae Hyun Lee, Daejeon (KR); Oh Byong Chae, Daejeon (KR); Seung Mo Oh, Daejeon (KR); Jeongbeom Lee, Daejeon (KR); Ji Heon Ryu, Daejeon (KR)

(73) Assignees: LG Chem, Ltd. (KR); Seoul National University R&DB Foundation (KR)

( * ) Notice: Subject to any disclaimer, the term of this patent is extended or adjusted under 35 U.S.C. 154(b) by 270 days.

(21) Appl. No.: 14/651,073

(22) PCT Filed: Mar. 3, 2014

(86) PCT No.: PCT/KR2014/001728
§ 371 (c)(1),
(2) Date: Jun. 10, 2015

(87) PCT Pub. No.: WO2014/142457
PCT Pub. Date: Sep. 18, 2014

(65) Prior Publication Data
US 2015/0318541 A1     Nov. 5, 2015

(30) Foreign Application Priority Data
Mar. 15, 2013 (KR) .................. 10-2013-0028309

(51) Int. Cl.
*H01M 4/36* (2006.01)
*H01M 4/62* (2006.01)
(Continued)

(52) U.S. Cl.
CPC ......... *H01M 4/364* (2013.01); *H01M 4/0404* (2013.01); *H01M 4/136* (2013.01);
(Continued)

(58) Field of Classification Search
CPC ............... H01M 4/364; H01M 4/5825; H01M 10/0569; H01M 4/485; H01M 4/1397;
(Continued)

(56) References Cited

U.S. PATENT DOCUMENTS 5,462,820 A * 10/1995 Tanaka .................... H01M 2/08
429/174
2004/0234856 A1 11/2004 Morigaki et al.
(Continued)

FOREIGN PATENT DOCUMENTS

JP   H01227357 A   9/1989
JP   07-029601 A   1/1995
(Continued)

OTHER PUBLICATIONS

Chinese Search Report for Application No. 20148005844.3 dated Dec. 21, 2016.
(Continued)

*Primary Examiner* — Gary D Harris
(74) *Attorney, Agent, or Firm* — Lerner, David, Littenberg, Krumholz & Mentlik, LLP

(57) ABSTRACT

Disclosed are a high-capacity negative electrode active material and a lithium secondary battery including the same. More particularly, the negative electrode active material includes 50 wt % or more of an alkali metavanadate based on the total weight of a negative electrode active material, wherein the alkali metavanadate has a crystalline phase or an amorphous phase, and a composition of formula $AVO_3$.

22 Claims, 10 Drawing Sheets

(51) Int. Cl.

| | |
|---|---|
| *H01M 4/66* | (2006.01) |
| *H01M 4/04* | (2006.01) |
| *H01M 4/485* | (2010.01) |
| *H01M 4/58* | (2010.01) |
| *H01M 10/0569* | (2010.01) |
| *H01M 4/136* | (2010.01) |
| *H01M 4/1397* | (2010.01) |
| *H01M 10/052* | (2010.01) |
| *H01M 4/505* | (2010.01) |
| *H01M 4/525* | (2010.01) |

(52) U.S. Cl.
CPC ......... *H01M 4/1397* (2013.01); *H01M 4/485* (2013.01); *H01M 4/5825* (2013.01); *H01M 4/622* (2013.01); *H01M 4/623* (2013.01); *H01M 4/625* (2013.01); *H01M 4/661* (2013.01); *H01M 10/0569* (2013.01); *H01M 4/505* (2013.01); *H01M 4/525* (2013.01); *H01M 10/052* (2013.01); *Y10T 428/2982* (2015.01)

(58) Field of Classification Search
CPC ...... H01M 4/136; H01M 4/622; H01M 4/623; H01M 4/661; H01M 4/0404; H01M 4/625; H01M 10/052; H01M 4/505; H01M 4/525; Y10T 428/2982
USPC .......................................................... 429/338
See application file for complete search history.

(56) References Cited

U.S. PATENT DOCUMENTS

| | | |
|---|---|---|
| 2008/0182171 A1 | 7/2008 | Maeda et al. |
| 2013/0323571 A1 | 12/2013 | Dai et al. |

FOREIGN PATENT DOCUMENTS

| | | | |
|---|---|---|---|
| JP | H07029601 A | | 1/1995 |
| JP | 7029601 B | * | 4/1995 |
| JP | 8-7886 | | 1/1996 |
| JP | H087886 A | | 1/1996 |
| JP | 02559055 B2 | | 11/1996 |
| JP | 2000063121 A | | 2/2000 |
| JP | 2011523765 A | | 8/2011 |
| KR | 2008-0056637 A | | 6/2008 |
| KR | 2013-0010808 A | | 1/2013 |
| KR | 20130010808 A | | 1/2013 |

OTHER PUBLICATIONS

Kim, et al, "Synthesis and characterization of MnV2O6 as a high capacity anode material for lithium secondary battery." Solid State Ionics 139 (2001) pp. 57-65.

Orsini, et al, "Chimi douce' synthesis and electrochemical properties of amorphous and crystallized LiNiVO4 vs. Li." Solid State Ionics 107 (1998), pp. 123-133.

Choi, et al., "Electrochemical properties of lithium vanadium oxide as an anode material for lithium-ion battery." Materials Chemistry and Physics, 116 (2009), pp. 603-606.

Piffard, et al., "The amorphous oxides MnV2O6σ(0<σ<1) as high capacity negative electrode materials for lithium batteries." Journal of Power Sciences 68 (1997), pp. 698-703.

Cheng, et al., "Carbon-Coated Li4Ti5O12 as a High Rate Electrode Material for Li-Ion Intercalation." Journal of the Electrochemical Society, 154 (7), pp. A692-A697 (2007).

Rossignol, et al., "X-Ray Absorption Spectroscopy Study of the Structural and Electronic Changes upon Cycling of LiNiVO4 as a Battery Electrode." Journal of the Electrochemical Society, 148 (8), pp. A869-A877 (2001).

International Search Report from PCT/KR2014/001728, dated Jun. 5, 2014.

* cited by examiner

[FIG. 1a]
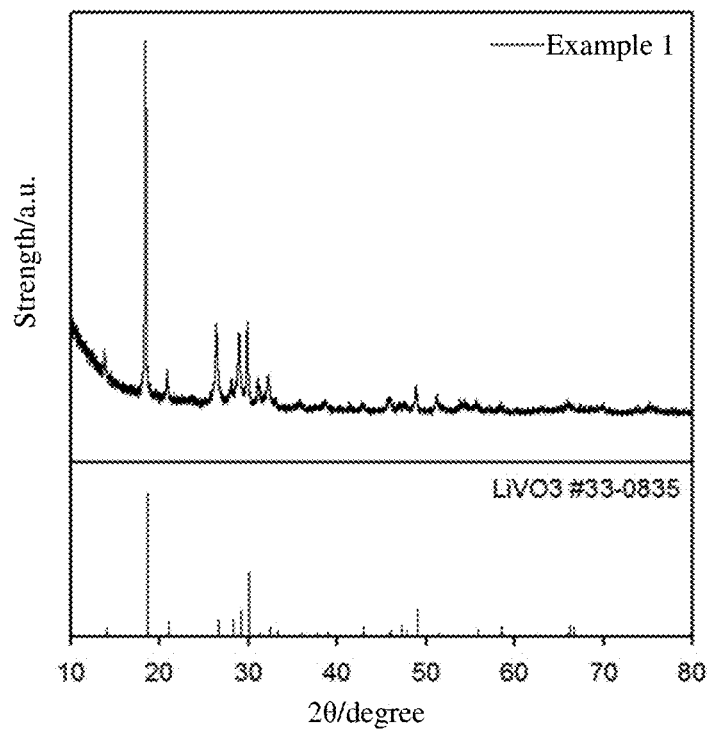
[FIG. 1b]
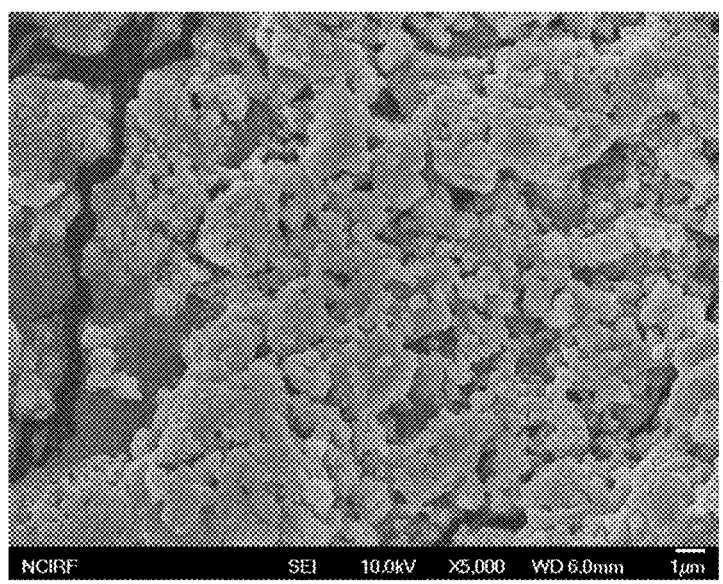

[FIG. 2a]
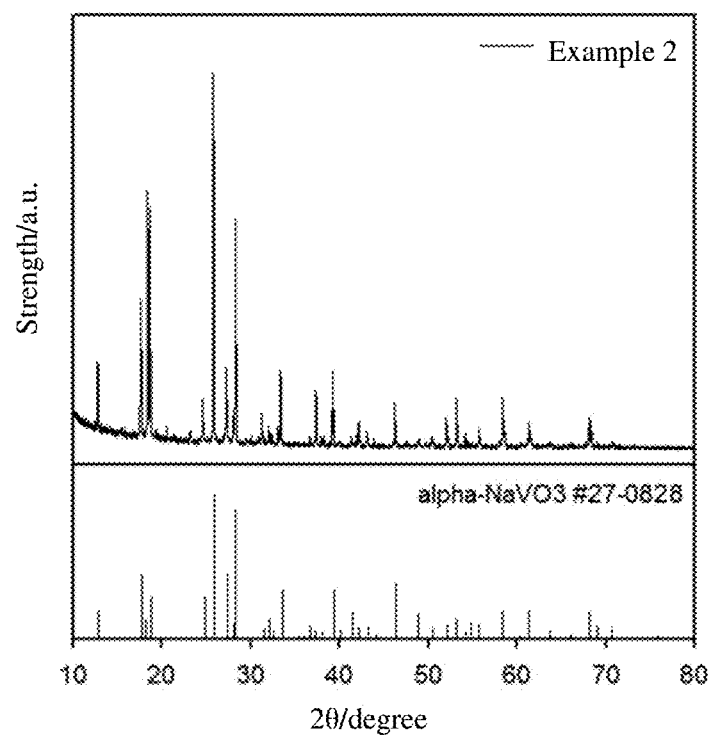

【FIG. 2b】
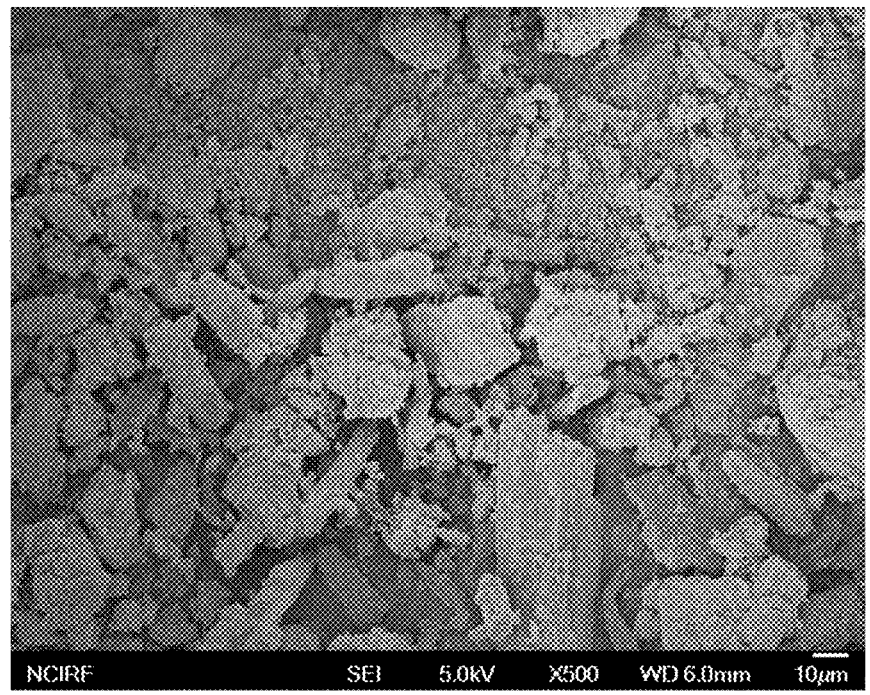
【FIG. 3a】
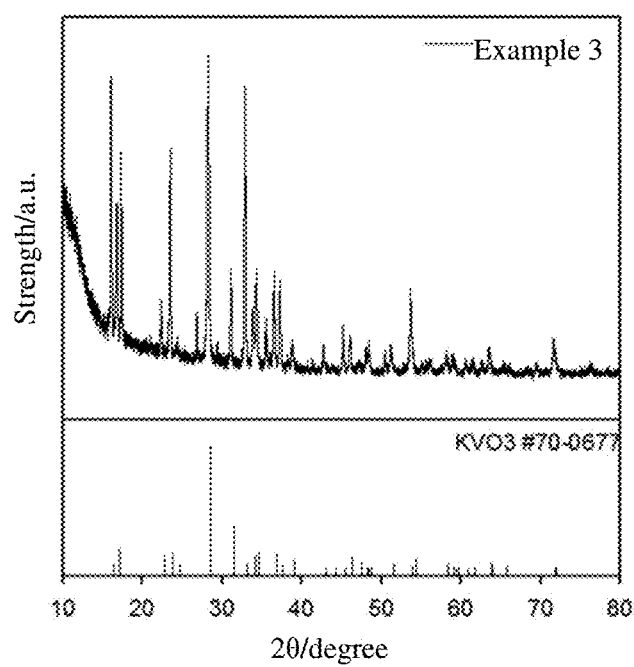

[FIG. 3b]
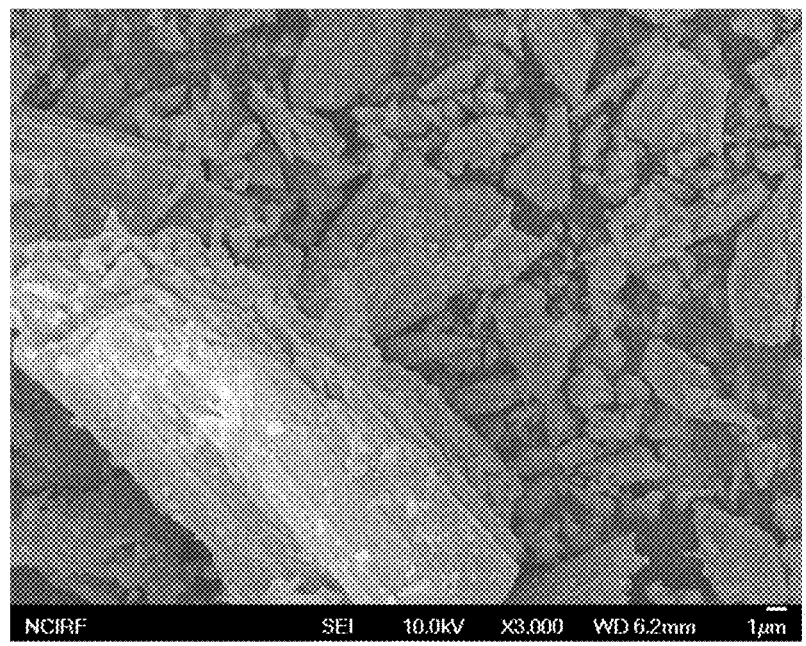
[FIG. 4a]
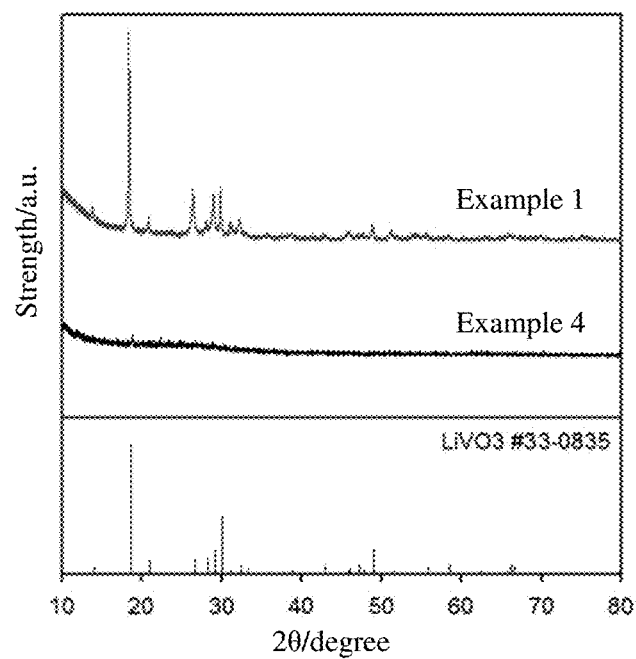

[FIG. 4b]
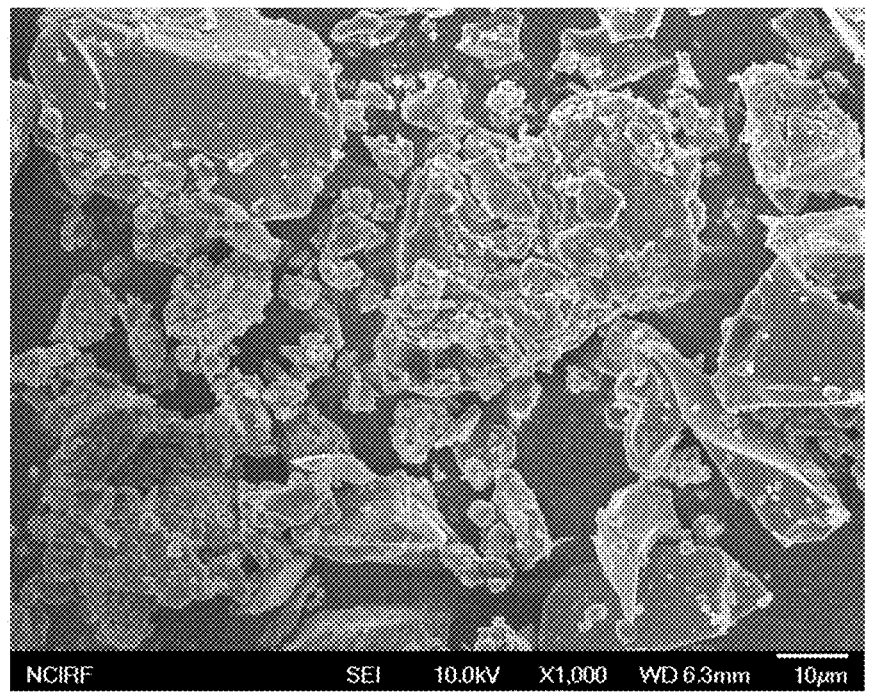
[FIG. 5a]
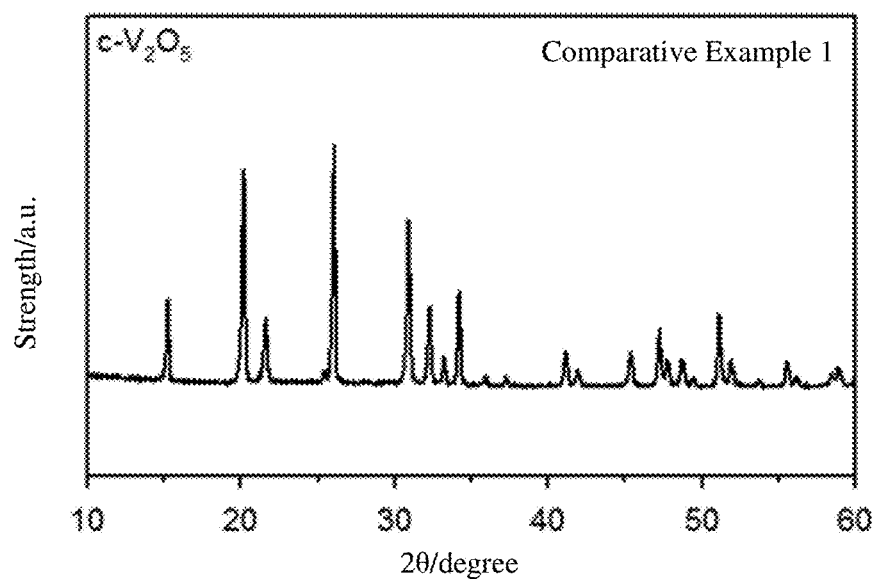

[FIG. 5b]
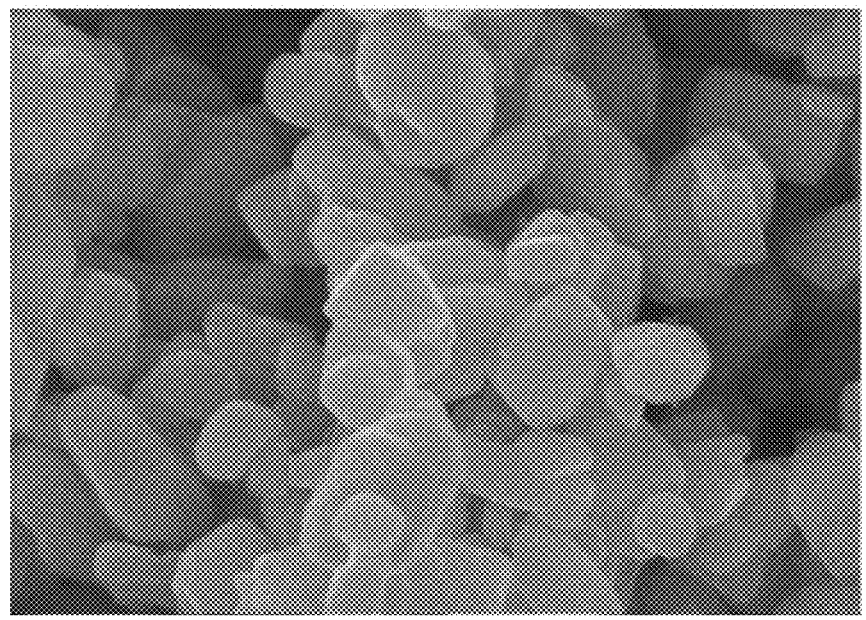
[FIG. 6]
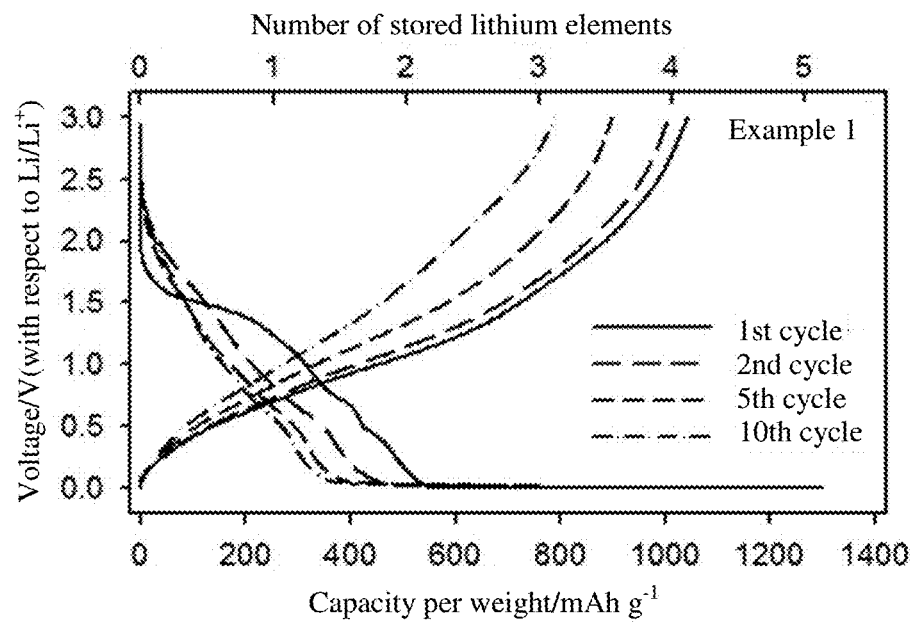

[FIG. 7]
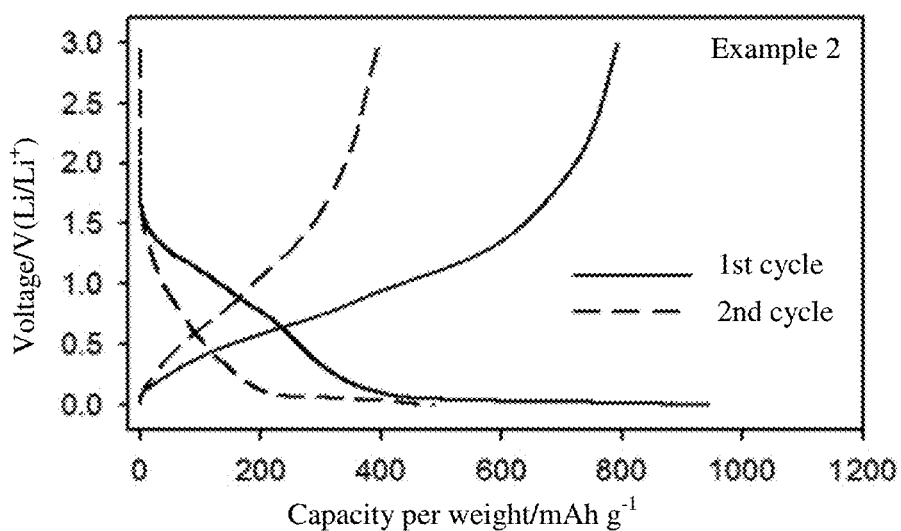
[FIG. 8]
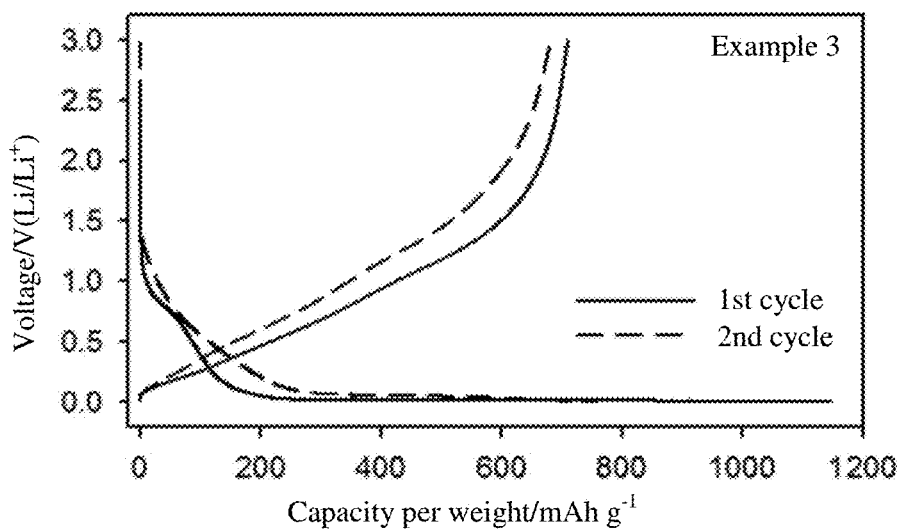

[FIG. 9]
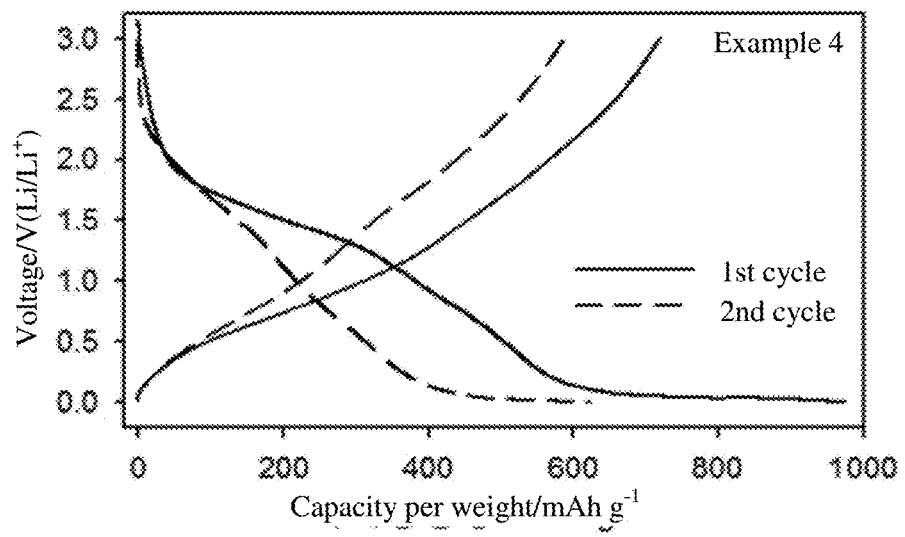
[FIG. 10]
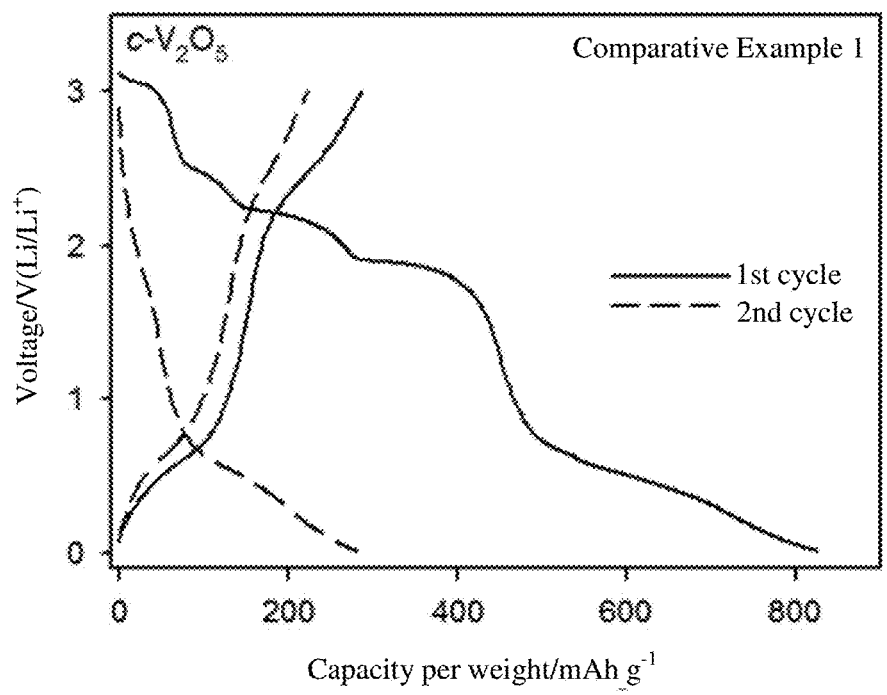

[FIG. 11]
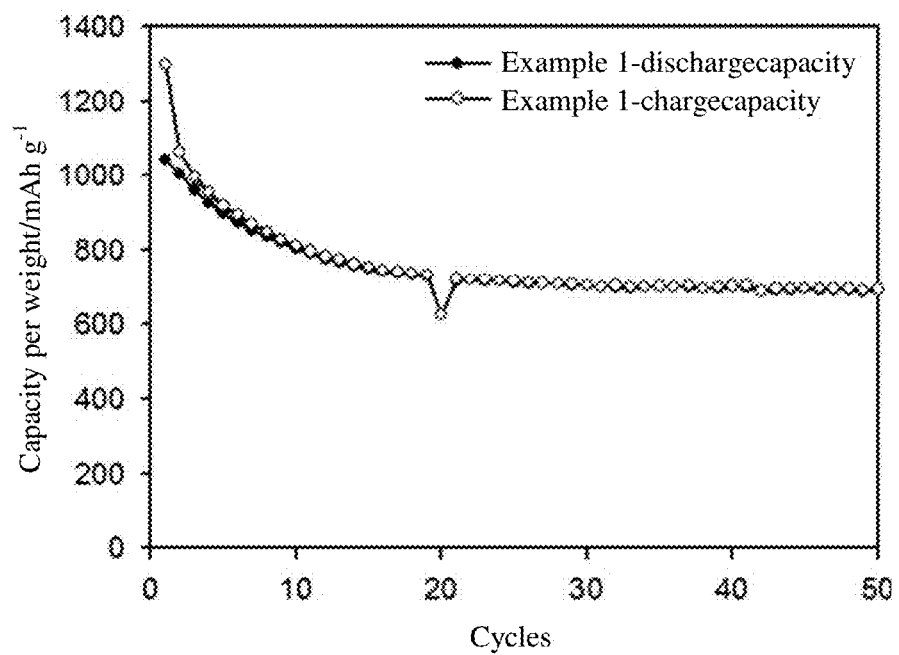

[FIG. 12]
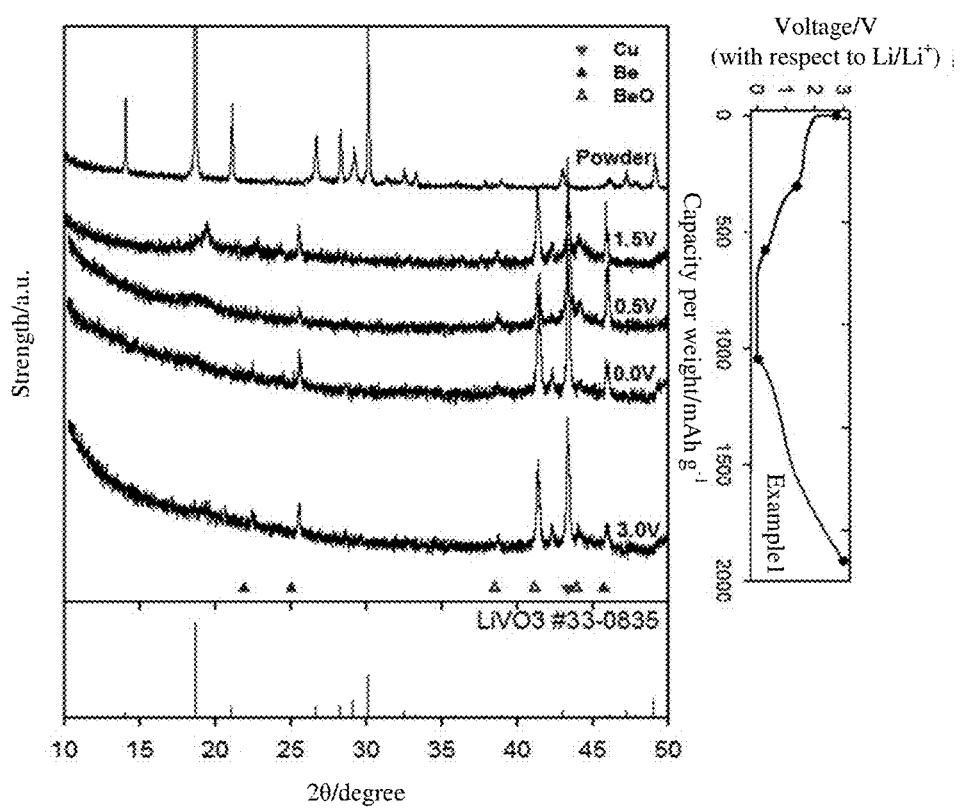

HIGH-CAPACITY NEGATIVE ELECTRODE ACTIVE MATERIAL AND LITHIUM SECONDARY BATTERY INCLUDING THE SAME

CROSS-REFERENCE TO RELATED APPLICATION

This application is a national phase entry under 35 U.S.C. § 371 of International Application No. PCT/KR2014/001728, filed Mar. 3, 2014, which claims priority to Korean Patent Application No. 10-2013-0028309, filed Mar. 15, 2013, the disclosures of which are incorporated herein by reference.

TECHNICAL FIELD

The present invention relates to a high-capacity negative electrode active material and a lithium secondary battery including the same. More particularly, the present invention relates to a negative electrode active material including 50 wt % or more of alkali metavanadate based on the total weight of a negative electrode active material, wherein the alkali metavanadate has a crystalline phase or an amorphous phase and a composition of formula $AVO_3$.

BACKGROUND ART

As energy prices are increasing due to depletion of fossil fuels and interest in environmental pollution is escalating, demand for environmentally-friendly alternative energy sources is bound to play an increasing role in future. Thus, research into various power generation techniques such as nuclear energy, solar energy, wind energy, tidal power, and the like, is underway, and power storage devices for more efficient use of the generated energy are also drawing much attention.

Specifically, demand for lithium secondary batteries as energy sources is rapidly increasing as mobile device technology continues to develop and demand therefor continues to increase. Recently, use of lithium secondary batteries as a power source of electric vehicles (EVs) and hybrid electric vehicles (HEVs) has been realized and the market for lithium secondary batteries continues to expand to applications such as auxiliary power suppliers through smart-grid technology Since lithium secondary batteries used as a power source of electric vehicles (EVs) and hybrid electric vehicles (HEVs) must have high energy density and exhibit high output within short time, and must be used for 10 years or more under a severe condition that charge and discharge due to large current are repeated in a short time, stability and long-term lifespan characteristics dramatically superior to conventional small lithium secondary battery are necessarily required.

In addition, since lithium secondary batteries used as a high-capacity power storage device must have high energy density and efficiency, and long lifespan, and ignition and explosion due to system malfunction caused by high performance and high capacity are linked to big accident, it is particularly important to secure stability and reliability.

In this regard, as a negative electrode active material of a negative electrode of conventional lithium secondary batteries, carbon based compounds, in which reversible intercalation and elimination of lithium ions are possible while maintaining structural and electrical properties, were mainly used.

In particular, carbon based compounds have an extremely low discharge potential, namely, approximately −3 V, with respect to a standard hydrogen electrode potential and exhibit extremely reversible charge and discharge behavior due to uniaxial orientation of a graphene layer, and, thus, superior electrode cycle life characteristics are exhibited. In addition, since an electrode potential may be 0 V Li/Li$^+$, which is similar to that of pure lithium metal during charge of Li ions, higher energy is advantageously obtained when an oxide based positive electrode and a battery are constituted.

However, negative electrodes composed of such carbon based compounds have problems as follows.

First, since the carbon based compounds have a theoretical maximum capacity of 372 mAh/g, there is a limitation in capacity increase. Thus, there is a limitation in performance of a sufficient role as an energy source of fast changing next-generation mobile devices.

Secondly, since the carbon based compounds exhibit a chemical potential similar to metal lithium when lithium ions are intercalated and eliminated, lithium precipitation due to overpotential is caused even at slightly high charge current and precipitation of lithium, which is precipitated once, is more accelerated as charge and discharge are repeated. Accordingly, capacity reduction and short circuit through dendrites are caused and, thus, stability may be considerably affected.

Thirdly, when lithium larger than an acceptable amount of a negative electrode due to overcharge and the like of a battery is charged, temperature is elevated and an exothermic reaction is caused. Such a reaction is the earliest reaction of thermodynamic reactions occurring within a battery and may be a major trigger of ignition explosion and the like of a battery.

Fourthly, a surface of a hydrophobic electrode greatly affects electrode wetting of an electrolyte solution when a battery is produced and the electrode wetting affects productivity reduction of a battery.

To resolve the problems, a research into negative electrode materials, in which Li alloy reaction using silicone (Si), germanium (Ge), tin (Sn), or aluminum (Al) rather than conventional carbon based negative electrodes is performed, is actively conducted. In the case of silicone as one of such alloy based negative electrode materials, a theoretical maximum capacity is approximately 3580 mAh/g, which is much higher than those of graphite based materials. Tin also has a large capacity of 990 mAh/g.

However, since such alloy based negative electrode materials exhibit very poor lifespan characteristics due to large volume change when charged and discharged, use thereof is greatly limited and, thus, use thereof may be limited.

Meanwhile, other than alloy based negative electrode materials, transition metal oxide based negative electrode active materials composed of a transition metal are also a focus of attention. Vanadium oxides and lithium vanadate based materials as the transition metal oxide based negative electrode active materials are researched as a positive electrode material and negative electrode material of lithium secondary batteries.

As vanadium based materials researched as a positive electrode active material, there are $V_2O_5$, $LiV_3O_8$, and the like. However, the materials have too low reaction voltage to use as a positive electrode active material of lithium secondary batteries. In addition, since lithium metal is used as a negative electrode, it is difficult to use the materials as a positive electrode material of actual batteries. At present, as positive electrode materials, a research into lithium vanadium phosphate, lithium vanadium fluoride phosphate, and the like, in which reaction voltage using inductive effects of multiple anion based materials is increased, is actively performed.

Meanwhile, research into vanadium based materials as a negative electrode active material of lithium secondary batteries using low reaction voltage of the vanadium based materials is performed. As representative materials, there are $V_2O_5$ and $LiVO_2$ based materials (for example, $Li_{1-x}VO_2$, $Li_{1-x}V_{1+x}O_2$), $LiMVO_4$, where M is Zn, Cd, Co, or Ni, $MV_2O_{6+\delta}$, where M is Fe, Mn, or Co, and the like, which may be used as a positive electrode active material.

For example, in J. Electrochem. Soc., Vol. 154, pp. A692-A697, L. Cheng et al., 2007, it was reported that reversible phase transition was caused when crystalline $V_2O_5$ stored one lithium or more within a structure thereof.

Therefore, since a structure of crystalline $V_2O_5$ is destroyed as cycles proceeds and capacity is decreased, it is disadvantageous to use the crystalline $V_2O_5$ as a negative electrode active material. To improve such problems, research into synthesis of amorphous $V_2O_5$ is underway.

In addition, in Mater. Chem. Phys. Vol. 116, pp. 603-606, N. S. Choi, et al., 2009, it was reported that $Li_{1-x}V_{1+x}O_2$ based materials having the same layered structure as $LiCoO_2$ most commonly used as a positive electrode active material expressed a capacity in a voltage section of 0.5 V lower than lithium and, thus, had operation voltage similar to a lithium secondary battery utilizing the commonly used carbon-based negative electrode active materials, when the $Li_{1-x}V_{1+x}O_2$ based materials were assembled into a lithium secondary battery.

However, the material has a significant limitation in that a reversible capacity thereof is approximately 200 mAh/g, much lower than a capacity of graphite. In addition, such a low reversible capacity is considered as being caused by vanadium, which already trivalently exists in a $Li_{1-x}V_{1+x}O_2$ material, stores lithium and additional reduction thereof is difficult.

In addition, in Solid State Ionics, Vol. 107, pp. 123-133, F. Orsini et al., 1998 and J. Power Sources., Vol. 68, pp. 698-703, Y. Piffard et al., 1997, it was reported that $LiMVO_4$ and $MV_2O_{6+\delta}$ may express dramatically high capacity, when compared with the vanadium based negative electrode active materials listed above.

However, in J. Electrochem. Soc., Vol. 148, pp. A869-A877, C. Rossignol et al., 2001 and Solid State Ionics, Vol. 139, pp. 57-65, S. S. Kim et al., 2001, it was reported that such high capacity is a phenomenon greatly helped and expressed by changes in the oxidation number of vanadium and the oxidation numbers of other transition metals, where M is Ni or Mn, included in the material.

In addition, some prior technologies disclose methods of adding small amounts of some vanadium oxide types to carbon based compounds to resolve the above problems. However, such vanadium oxides added in small amounts are recognized as inactive materials which do not store lithium in carbon based compounds and, thus, capacity in a low voltage section is partially increased by increasing a diffusion rate of lithium ions and there is fundamental limitation due to low reversible capacity of the carbon based compounds.

Therefore, there is an urgent need to develop a negative electrode, which may be used as a high-capacity power source, having improved stability, high-output characteristics and high energy density.

DISCLOSURE

Technical Problem

Therefore, the present invention has been made to solve the above and other technical problems that have yet to be resolved.

As a result of a variety of extensive and intensive studies and experiments, the inventors of the present application confirmed that capacity and energy density of a lithium secondary battery may be increased by using an alkali metavanadate exhibiting a high capacity per unit weight at a low reaction potential, as a negative electrode material, to resolve problems of lithium secondary batteries using a metal oxide based negative electrode material, thus completing the present invention.

Therefore, the present invention aims to provide a secondary battery in which reactivity with lithium increases due to amorphization of alkali metavanadate in a first charge process by including alkali metavanadate having a specific composition as a main ingredient of a negative electrode active material and, thus, high capacity at a low reaction potential, which is not exhibited in conventional transition metal oxide based negative electrode active materials, is exhibited, and, accordingly, total voltage of a battery is increased and energy density of a battery is dramatically improved.

Technical Solution

In accordance with one aspect of the present invention, provided is a negative electrode active material including 50 wt % or more of alkali metavanadate based on the total weight of a negative electrode active material, wherein the alkali metavanadate has a composition of Formula 1 below, and a crystalline phase or an amorphous phase:

$$AVO_3 \qquad (1)$$

wherein A is at least one alkali metal element of Li, Na, and K.

In a specific embodiment, the amorphous alkali may be a compound or mixture of $AVO_3$ and $P_2O_5$, wherein $P_2O_5$ may be included in an amount of 1 to 30 parts by weight based on 100 parts by weight of $AVO_3$.

The amorphous alkali metavanadate may be confirmed through X-ray diffraction analysis. When X-ray diffraction of the amorphous phase was measured from 10 degrees to 80 degrees at a scan rate of 1 degree/a minute to 16 degrees/a minute and an interval of 0.01 degrees, a ratio of signal to noise was less than 50, compared to a noise shown in a base line.

In the case of the negative electrode active material, the crystalline alkali metavanadate may be advantageously prepared without impurities but the amorphous alkali metavanadate may be advantageously and stably charged and discharged due to easy material diffusion, small volume change during charge and discharge, and the like. In a specific embodiment, a charge voltage of the negative electrode active material may be up to less than 1.5 V with respect to reduction potential of lithium ions based on a negative electrode. In this regard, a reversible capacity of the negative electrode active material is 400 mAh/g or more.

In another specific embodiment, when the charge voltage of the negative electrode active material progresses up to less than 0.1 V with respect to reduction potential of lithium ions based on a negative electrode, a reversible capacity of the negative electrode active material represents 400 mAh/g or more.

In addition, when a discharge voltage of the negative electrode active material progresses up to 2.5 V or more with respect to reduction potential of lithium ions based on a negative electrode, a reversible capacity of the negative electrode active material may be 400 mAh/g or more and one vanadium (V) element included in the negative electrode active material may reversibly store three lithium elements or more.

Therefore, although charging of the alkali metavanadate ($AVO_3$) negative electrode active material according to the present invention is started at a state being crystalline characteristics, it is changed into an amorphous state during a charge process and a structure thereof is irreversibly maintained. Accordingly, the alkali metavanadate ($AVO_3$) negative electrode active material has reversible capacity reduction smaller than crystalline $V_2O_5$ and vanadium at a 5+ oxidation state in an $AVO_3$ material, and thus may store a larger amount of lithium than $LiVO_2$ based materials even while having a reaction voltage near 0 V with respect to a lithium reduction potential, similarly to the $LiVO_2$ based materials. Accordingly, depending on material types, a capacity per unit weight of greater than 1,000 mAh/g and energy density may be accomplished.

In addition, the alkali metavanadate based negative electrode active material is different from conventional negative electrode active materials in that the alkali metavanadate based negative electrode active material is charged while representing a smooth incline without a flat portion during discharge. Due to the characteristics of the alkali metavanadate based negative electrode active material, a ratio of voltage to remaining capacity has a linear relationship and, thus, prediction of a remaining capacity of a battery (state-of-charge estimation) may be easily and exactly predicted only with voltage of a battery.

Such facts may be more clearly confirmed through Examples, Experimental Examples, and the like described below.

As described above, since the alkali metavanadate is included in an amount of 50 wt % or more based on a total weight of the negative electrode active material, a desired capacity per unit weight and an energy density may not be accomplished when the amount of the alkali metavanadate is less than 50 wt %. The amount of the alkali metavanadate may be particularly 50 to 100 wt %, more particularly 60 to 100 wt %. When the amount of the alkali metavanadate is less than 100 wt %, other compounds or polymers publicly known as negative electrode active materials in the art may be included. Examples of the compounds or polymers include carbon such as hard carbon and graphite-based carbon; metal composite oxides such as $Li_xFe_2O_3$ where $0 \leq x \leq 1$, $Li_xWO_2$ where $0 \leq x \leq 1$, and $Sn_xMe_{1-x}Me'_yO_z$ where Me:Mn, Fe, Pb or Ge; Me':Al, B, P, Si, Group I, Group II and Group III elements, or halogens; $0 \leq x \leq 1$; $1 \leq y \leq 3$; and $1 \leq z \leq 8$; lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li—Co—Ni based materials; titanium oxides; lithium titanium oxides; and the like, but the present invention is not limited thereto.

Meanwhile, an average particle size of the alkali metavanadate is preferably 1 to 30 μm. In particular, the average particle size is preferably 5 to 20 μm. When an average particle size of the alkali metavanadate is extremely small, a process of manufacturing an electrode becomes complex. On the other hand, when the average particle size is extremely large, a diffusion distance of lithium is extended and, thus, rate characteristics are deteriorated.

In addition, the present invention provides a lithium secondary battery including a negative electrode including the negative electrode active material, a positive electrode including at least one of a lithium metal oxide or lithium metal phosphate, a separator disposed between the negative electrode and the positive electrode, and electrolyte.

The positive electrode may be manufactured by, for example, coating a mixture of the positive electrode active material, a conductive agent, and a binder on a positive electrode current collector and drying the coated positive electrode current collector. The mixture may further include a filler as desired.

A lithium metal oxide of the positive electrode is $LiMO_2$, where M is Co, Ni, or Mn, $Li_{1+x}Mn_{2-x}O_{4+}$, where $0 \leq x \leq 0.3$, or $LiNi_{1-x}M_xO_2$, where M is Co, Mn, Al, Cu, Fe, Mg, B or Ga, and $0.01 \leq x \leq 0.3$, and the lithium metal phosphate is $LiMPO_4$, where M is Fe, Co, Ni, or Mn, or the like. In particular, the lithium metal oxide of the positive electrode is $LiCoO_2$, $LiNiO_2$, $LiMn_2O_4$, $Li(Ni_aMn_bCo_c)O_2$, where $a+b+c=1$, $LiNi_{0.5}Mn_{1.5}O_4$, or $LiNi_{0.5}Mn_{0.5}O_2$, and the lithium metal phosphate is $LiFePO_4$, $LiMnPO_4$, $Li_3V_2(PO_4)_3$, or the like, but the present invention is not limited thereto. There among, application of $LiNi_{0.5}Mn_{1.5}O_4$, $LiCoPO_4$, $yLi_2MnO_3 \cdot (1-y)LiNi_aMn_b\text{-}Co_cO_2$, where $0.2 \leq y \leq 0.8$ and $a+b+c=1$, and $Li_3V_2(PO_4)_3$ operable at a voltage of 4.5 V or more is more preferable.

The conductive material is typically added in an amount of 1 to 30 wt % based on the total weight of the mixture including the positive electrode active material. There is no particular limit as to the conductive material, so long as it does not cause chemical changes in the fabricated battery and has conductivity. Examples of conductive materials include graphite such as natural or artificial graphite; carbon black such as carbon black, acetylene black, Ketjen black, channel black, furnace black, lamp black, and thermal black; conductive fibers such as carbon fiber and metallic fiber; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between an electrode active material and the conductive material and in binding of the electrode active material to an electrode current collector. The binder is typically added in an amount of 1 to 30 wt % based on the total weight of the mixture including the positive electrode active material. Examples of the binder include, without being limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, and various copolymers.

The filler is optionally used as a component to inhibit positive electrode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

The positive electrode according to the present invention may be manufactured by coating, on a positive electrode current collector, a slurry prepared by mixing the positive electrode mixture including the above-described compounds with a solvent such as NMP or the like and drying and pressing the coated positive electrode current collector.

The positive electrode current collector is generally fabricated to a thickness of 3 to 500 µm. The positive electrode current collector is not particularly limited so long as it does not cause chemical changes in the fabricated lithium secondary battery and has conductivity. For example, the positive electrode current collector may be made of stainless steel, aluminum, nickel, titanium, sintered carbon, aluminum or stainless steel surface-treated with carbon, nickel, titanium, or silver, or the like. The positive electrode current collector may have fine irregularities at a surface thereof to increase adhesion between the positive electrode active material and the positive electrode current collector. In addition, the positive electrode current collector may be used in any of various forms including films, sheets, foils, nets, porous structures, foams, and non-woven fabrics.

The present invention also provides a lithium secondary battery including the positive electrode, a negative electrode, a separator, and a lithium salt-containing non-aqueous electrolyte.

The negative electrode may be manufactured by, for example, coating a negative electrode mixture including a negative electrode active material on a negative electrode current collector and drying the coated negative electrode current collector. As desired, the negative electrode mixture may further include the above-described components. In addition, the negative electrode may operate in a voltage section of 0 V to 3.5 V with respect to lithium.

The negative electrode current collector is typically fabricated to a thickness of 3 to 500 µm. The negative electrode current collector is not particularly limited so long as it does not cause chemical changes in the fabricated battery and has high conductivity. For example, the negative electrode current collector may be made of copper, stainless steel, aluminum, nickel, titanium, sintered carbon, copper or stainless steel surface-treated with carbon, nickel, titanium, or silver, and aluminum-cadmium alloys. Similar to the positive electrode current collector, the negative electrode current collector may also have fine irregularities at a surface thereof to enhance adhesion between the negative electrode current collector and the negative electrode active material and be used in various forms including films, sheets, foils, nets, porous structures, foams, and non-woven fabrics.

The separator is disposed between the positive electrode and the negative electrode and, as the separator, an insulating thin film having high ion permeability and mechanical strength is used. The separator typically has a pore diameter of 0.01 to 10 µm and a thickness of 5 to 300 µm. As the separator, sheets or non-woven fabrics, made of an olefin polymer such as polypropylene, glass fibers or polyethylene, which have chemical resistance and hydrophobicity, or the like are used. When a solid electrolyte such as a polymer or the like as the electrolyte is used, the electrolyte may also function as a separator.

The lithium salt-containing non-aqueous electrolyte solution is composed of an electrolyte solution and a lithium salt, and as the electrolyte solution, a non-aqueous organic solvent, organic solid electrolyte, inorganic solid electrolyte, or the like may be used.

For example, the non-aqueous organic solvent may be an aprotic organic solvent such as N-methyl-2-pyrrolidone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the non-aqueous electrolyte. Examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imides.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), fluoro-propylene carbonate (FPC), or the like.

In addition, the present invention provides a method of manufacturing an electrode using the negative electrode active material.

In a specific embodiment, the method of manufacturing an electrode includes:

mixing a powder of the negative electrode active material with a binder and a dispersion to prepare a paste;

spreading the paste over a current collector for an electrode; and drying the paste at 50 to 200;

In particular, in preparation of the paste, a conductive material is additionally added and mixed, wherein the conductive material may be at least one of a powder type carbon black, vapor grown carbon fiber, and graphite, and may be included in an amount of 1 to 30 parts by weight with respect to 100 parts by weight of the negative electrode active material.

In the preparing of the paste, alkali metavanadate may be an $AVO_3$ type, where A is at least one of Li, Na, and K, and may be crystalline or amorphous.

The dispersion is at least one of N-methylpyrrolidone (NMP), isopropyl alcohol, acetone and water, and included in an amount of 10 to 200 parts by weight with respect to 100 parts by weight of the negative electrode active material; and the binder is at least one of polytetrafluoroethylene (PTFE), polyvinylidene fluoride (PVdF), cellulose, styrene butadiene rubber (SBR), polyimides, polyacrylic acid, alkali polyacrylate, polymethyl methacrylate (PMMA), and polyacrylonitrile (PAN), and included in an amount of 3 to 50 parts by weight with respect to 100 parts by weight of the negative electrode active material.

The collector for the electrode is preferably at least one of copper, aluminum, stainless, nickel, and titanium.

BRIEF DESCRIPTION OF THE DRAWINGS

The above and other objects, features and other advantages of the present invention will be more clearly understood from the following detailed description taken in conjunction with the accompanying drawing, in which:

FIG. 1a illustrates an X-ray diffraction analysis result of a transition metal oxide obtained from Example 1 according to the present invention;

FIG. 1b illustrates an electron microscope image of a transition metal oxide obtained from Example 1 according to the present invention;

FIG. 2a illustrates an X-ray diffraction analysis result of a transition metal oxide obtained from Example 2 according to the present invention;

FIG. 2b illustrates an electron microscope image of a transition metal oxide obtained from Example 2 according to the present invention;

FIG. 3a illustrates an X-ray diffraction analysis result of a transition metal oxide obtained from Example 3 according to the present invention;

FIG. 3b illustrates an electron microscope image of a transition metal oxide obtained from Example 3 according to the present invention;

FIG. 4a illustrates an X-ray diffraction analysis result of a transition metal oxide obtained from Example 4 according to the present invention;

FIG. 4b illustrates an electron microscope image of a transition metal oxide obtained from Example 4 according to the present invention;

FIG. 5a illustrates an X-ray diffraction analysis result of a transition metal oxide according to Comparative Example 1;

FIG. 5b illustrates an electron microscope image of a transition metal oxide according to Comparative Example 1;

FIG. 6 illustrates a graph representing electrochemical characteristics related to lithium storage of a transition metal oxide obtained from Example 1 according to the present invention;

FIG. 7 illustrates a graph representing electrochemical characteristics related to lithium storage of a transition metal oxide obtained from Example 2 according to the present invention;

FIG. 8 illustrates a graph representing electrochemical characteristics related to lithium storage of a transition metal oxide obtained from Example 3 according to the present invention;

FIG. 9 illustrates a graph representing electrochemical characteristics related to lithium storage of a transition metal oxide obtained from Example 4 according to the present invention;

FIG. 10 illustrates a graph representing electrochemical characteristics related to lithium storage of a transition metal oxide according to Comparative Example 1;

FIG. 11 illustrates a graph representing lifespan characteristics when a transition metal oxide obtained from Example 1 according to the present invention is applied to a lithium battery; and FIG. 12 illustrates an ex-situ X-ray diffraction analysis result of a transition metal oxide obtained from Example 1 according to the present invention.

MODE FOR INVENTION

Now, the present invention will be described in more detail with reference to the following examples. These examples are provided only for illustration of the present invention and should not be construed as limiting the scope and spirit of the present invention.

Example 1

Preparation of Crystalline $LiVO_3$

Lithium carbonate ($Li_2CO_3$) and vanadium pentoxide ($V_2O_5$) were mixed in a molar ratio of 1:1 in an agate mortar and thermally treated then for 4 hours at 750° C. in the atmosphere. Subsequently, the resultant mixture was cooled to room temperature and ground in an agate mortar. To uniformalize particles of the grinded powder, the powder was additionally ball-milled for 2 hours. As a result, a transition metal oxide was prepared.

Example 2

Preparation of Crystalline $NaVO_3$

A transition metal oxide was prepared in the same manner as in Example 1, except that sodium carbonate ($Na_2CO_3$) and vanadium pentoxide ($V_2O_5$) were mixed in a molar ratio of 1:1.

Example 3

Preparation of Crystalline $KVO_3$

A transition metal oxide was prepared in the same manner as in Example 1, except that potassium carbonate ($K_2CO_3$) and vanadium pentoxide ($V_2O_5$) were mixed in a molar ratio of 1:1.

Example 4

Preparation of Amorphous $LiVO_3$

A transition metal oxide was prepared in the same manner as in Example 1, except that 5 parts by weight of $P_2O_5$ was added to 100 parts by weight of crystalline $LiVO_3$ synthesized according to Example 1 and mixed.

Comparative Example 1

Crystalline $V_2O_5$ manufactured by Aldrich was used.

Comparative Example 2

DAG 87, which is natural graphite, manufactured by SODIFF (KR) was used.

Comparative Example 3

A transition metal oxide was prepared in the same manner as in Example 1, except that crystalline $LiVO_3$ synthesized according to Example 1 and DAG 87 according to Comparative Example 2 were mixed in a weight ratio of 1:99.

Comparative Example 4

A transition metal oxide was prepared in the same manner as in Example 1, except that crystalline $LiVO_3$ synthesized according to Example 1 and DAG 87 according to Comparative Example 2 were mixed in a weight ratio of 30:70.

Example 5

A transition metal oxide was prepared in the same manner as in Example 1, except that crystalline $LiVO_3$ synthesized according to Example 1 and DAG 87 according to Comparative Example 2 were mixed in a weight ratio of 90:10.

Example 6

A transition metal oxide was prepared in the same manner as in Example 1, except that crystalline $LiVO_3$ synthesized according to Example 1 and DAG 87 according to Comparative Example 2 were mixed in a weight ratio of 70:30.

Example 7

A transition metal oxide was prepared in the same manner as in Example 1, except that crystalline $LiVO_3$ synthesized according to Example 1 and DAG 87 according to Comparative Example 2 were mixed in a weight ratio of 50:50.

Experimental Example 1

X-Ray Diffraction Analysis Experiment and Particle Shape Observation

To measure crystallization of the transition metal oxides prepared according to the present invention, X-ray diffraction analysis of the transition metal oxides according to Examples 1 to 4 and Comparative Example 1 was carried out. In addition, to confirm particle shapes of the transition metal oxides prepared according to the present invention, the transition metal oxides according to Examples 1 to 4 and Comparative Example 1 were observed with an electron microscope.

As illustrated in FIGS. 1a and 1b, in the case of $LiVO_3$ of Example 1, characteristic peaks of $LiVO_3$ were observed as an X-ray diffraction result. Accordingly, it was confirmed that $LiVO_3$ was crystalline and several micrometers particles not having a clear shape.

As illustrated in FIGS. 2a and 2b, in the case of $NaVO_3$ of Example 2, characteristic peaks of $NaVO_3$ were observed as an X-ray diffraction result. Accordingly, it was confirmed that $NaVO_3$ was crystalline and several to several dozen micrometer particles having a texture pattern.

As illustrated in FIGS. 3a and 3b, in the case of $KVO_3$ of Example 3, characteristic peaks of $KVO_3$ were observed as an X-ray diffraction result. Accordingly, it was confirmed that $NaVO_3$ was crystalline and several to several dozen micrometer particles having a texture pattern.

As illustrated in FIGS. 4a and 4b, in the case of $LiVO_3$ of Example 4, significant peaks were not observed as an X-ray diffraction result. Accordingly, it was confirmed that $LiVO_3$ was amorphous and several micrometers particles not having a clear shape.

As illustrated in FIGS. 5a and 5b, in the case of $V_2O_5$ of Comparative Example 1, characteristic peaks of $V_2O_5$ were observed as an X-ray diffraction result. Accordingly, it was confirmed that $V_2O_5$ was crystalline and several micrometers particles not having a clear shape.

Manufacture of Electrode

To confirm a charge and discharge capacity and evaluate electrochemical characteristics of a lithium secondary battery using negative electrode active materials according to Examples and Comparative Examples of the present invention, transition metal oxides prepared according to Examples 1 to 7 and Comparative Examples 1 to 4 were used alone or mixed to manufacture electrodes.

To provide electrical conductivity to the electrodes, carbon black as a conductive material and polyvinylidene difluoride (PvdF) as a polymer binder were used. As the binder, a binder dissolved in N-methylpyrrolidone was used.

After mixing the active material:conductive material: binder in a weight ratio of 80:10:10 and sufficiently stirring, the resultant mixture was coated over a copper collector and dried at 120 to remove N-methylpyrrolidone. The dried electrode was pressed using a roll press and then cut into a desired size. The cut electrode was dried for 12 hours or more at a 120 vacuum oven to remove water.

Using the electrode manufactured as described above, a 2032 coin cell was manufactured under an argon atmosphere in a glove box. In this regard, as an opposite electrode, lithium metal foil was used and, as an electrolyte, a 1 molar mixture of $LiPF_6$/ethylene carbonate (EC):dimethyl carbonate (DMC) mixed in a volume ratio of 1:2 was used. As a result, an electrochemical cell was manufactured.

Experimental Example 2

Confirmation of Reaction Voltage and Capacity of Material

Charge and discharge experiment for coin cells manufactured using the transition metal oxides prepared according to Examples 1 to 4 and Comparative Example 1 were carried out at constant current. When charged and discharged, a current of 50 mA/g was used based on a weight of an active material in a voltage section of 0.001 to 3.0 V (vs. $Li/Li^+$).

As results of the experiments, in the case of $LiVO_3$ of Example 1, a potential flat side near 1.5 V was observed, as illustrated in FIG. 6. The potential flat side was not observed from a second cycle but, in a range of 1.5 to 2.5 V, smooth potential change was observed.

In addition, near 0.5 V, another smooth potential change was observed and, near 0.0 V, there is an extremely long potential flat side. In addition, a total capacity of approximately 1,300 mAh/g and a reversible discharge capacity of 1000 mAh/g or more were achieved.

The discharge capacity means that four lithium elements per $LiVO_3$ molecule were reversibly charged and discharged. In addition, in a discharge process, capacity is expressed at a smooth incline state without development of a flat portion.

As illustrated in FIG. 7, in the case of $NaVO_3$ of Example 2, smooth potential change was observed near 1.0 V when initial charge is performed. Such potential change was not observed from a second cycle but smooth potential change in a range of 0.0 to 1.5 V was observed.

Subsequently, near 0.0 V, an extremely long potential flat side was observed, a capacity of approximately 900 mAh/g was stored, and a reversible capacity of 700 mAh/g or more was expressed. Such a discharge capacity means that 3.6 lithium elements per $NaVO_3$ are reversibly charged and discharged. In addition, as in Example 1, in a range of 0 to 1.5 V, a capacity was expressed while exhibiting smooth voltage increase.

As illustrated in FIG. 8, in the case of $KVO_3$ of Example 3, smooth potential change was observed near 0.8 V when first charge is performed. Such potential change was changed into smooth potential change at 0.0 to 1.5 V from a second cycle. Subsequently, near 0.0 V, an extremely long potential flat side was observed, lithium was stored up to approximately 1,200 mAh/g, and a reversible capacity of 700 mAh/g or more was expressed.

Such a discharge capacity means that 3.66 lithium elements per $KVO_3$ were reversibly charged and discharged. In a second cycle, near 0.0 V, a long potential flat side was observed and a reversible capacity of 600 mAh/g was observed. In addition, as described above, smooth voltage increase and a capacity were exhibited in a section of 0 to 1.5 V.

As illustrated in FIG. 9, in the case of the amorphous $LiVO_3$ of Example 4, smooth potential change was observed from 1.7 V when first charge is performed. Subsequently, neat 0.0 V, a capacity of approximately 970 mAh/g was stored while exhibiting a potential flat side and a reversible capacity of 700 mAh/g was smoothly expressed in a section of 0.5 to 3.0 V.

Such a discharge capacity means that 2.84 lithium elements per $LiVO_3$ were reversibly charged and discharged.

As illustrated in FIG. 10, in the case of the crystalline $V_2O_5$ of Comparative Example 1, a potential flat side was observed near 3.0 V, 2.5 V, 2.2 V, 1.8 V, and 0.6 V and a capacity greater than 800 mAh/g was stored, when initial charging is performed. However, only a capacity of less than 300 mAh/g corresponding to 1.9 lithium elements per $V_2O_5$ was discharged and a capacity was expressed while having flat portions near 0.6 V and 2.3 V.

Experimental Example 3

Lifespan Characteristics of Batteries

The coin cell using the transition metal oxide prepared according to Example 1 was charged in a constant current/constant voltage manner and discharged in a constant current. Subsequently, lifespan characteristics of a battery manufactured with the corresponding material were measured. When constant current charging is performed, the charge was performed up to a voltage section of 50 mV (vs. Li/Li$^+$) using a current of 100 mA/g based on the weight of active material and then constant voltage charging was performed at 50 mV.

Constant voltage charging was stopped when an absolute size of current is less than 10 mA/g based on the weight of active material and constant current discharge was started. The constant current discharge was performed up to a voltage section of 3 V (vs. Li/Li$^+$) in which a current of 100 mA/g based on the weight of active material was used.

As results of the experiments, it was confirmed that, as illustrated in FIG. 11, reduction of charge and discharge capacities was observed up to initial 15 cycles but, subsequently, a reversible capacity of 700 mAh/g or more corresponding to three lithium elements or more per $LiVO_3$ without reduction of capacity up to 50 cycles was expressed.

Experimental Example 4

Characteristics of Structural Changes According to Charge and Discharge of Materials While conducting a charge and discharge experiment of the coin cell manufactured using the transition metal oxide prepared according to Example 1 at constant current, X-ray diffraction analysis therefor was performed according to an ex-situ method.

When charged and discharged, a current of 50 mA/g was used in a voltage section of 0.001 to 3.0 V (vs. Li/Li$^+$). X-ray diffraction analysis was carried out by attaching an electrode to a beryllium window with a Kapton tape, after stopping charging at 1.5 V, 0.5 V, and 0.0 V when first cycle charging was performed and discharge at 3.0 V, and obtaining the electrode manufactured with the sample prepared according to Example 1 by disassembling the coin cell under an argon atmosphere in a glove box.

As results of the experiments, as illustrated in FIG. 12, peaks of $LiVO_3$, which exhibited high peak strength and high crystallization before charge, became smaller as charging proceeded, charging was stopped at 0.0 V, and specific peaks corresponding to $LiVO_3$ were not observed in a diffraction pattern obtained from X-ray diffraction analysis. In addition, an X-ray diffraction pattern measured after discharging $LiVO_3$ up to 3.0 V was also the same as the result.

From the result, it was confirmed that crystalline $LiVO_3$ was changed into an amorphous phase during a charging process, which is an electrochemically irreversible reaction.

Experimental Example 5

Comparison of Capacity Characteristics According to Amounts of Materials

Discharge capacities of the transition metal oxide prepared according to Example 1, the natural graphite negative electrode active material prepared according to Comparative Example 2, and materials of Examples 5 to 7 and Comparative Examples 3 to 4 prepared by mixing the transition metal oxide and the natural graphite negative electrode active material in a variety of weight ratios were measured at a tenth cycle in which a capacity of a battery was stabilized. Results are summarized in Table 1 below.

TABLE 1

|  | Mix ratio of materials ($LiVO_3$:natural graphite) | Reversible capacity per weight (mAh/g) |
| --- | --- | --- |
| Example 1 | 100:0 | 803.7 |
| Example 5 | 90:10 | 746.8 |
| Example 6 | 70:30 | 642.4 |
| Example 7 | 50:50 | 557.0 |
| Comparative Example 2 | 0:100 | 334.2 |
| Comparative Example 3 | 1:99 | 336.9 |
| Comparative Example 4 | 30:70 | 475.0 |

As shown in Table 1, it was confirmed that, in comparative examples including a small amount of crystalline $LiVO_3$ prepared according to Example 1, the capacity of the negative electrode active material was extremely, slightly affected. On the other hand, it was confirmed that, in the batteries prepared by mixing 50 wt % of more the transition metal oxide according to the present invention, a high capacity of 500 mAh/g or more was expressed and, thus, a capacity per unit weight and energy density dramatically higher than conventional negative electrode active materials may be accomplished.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, a secondary battery including a negative electrode active material according to the present invention includes alkali metavanadate in an amount of 50 wt % or more based on a total weight of the negative electrode active material. Accordingly, reactivity with lithium due to amorphization of alkali metavanadate in an initial charge process is increased and, thus, high capacity at a low reaction potential, which is not expressed in conventional transition metal oxide based negative electrode active materials, is expressed. Accordingly, a secondary battery, in which total voltage of a battery may be increased and energy density of a battery may be dramatically improved, may be provided.

The invention claimed is:

1. A negative electrode active material comprising alkali metavanadate, and
graphite,
wherein the alkali metavandate is present in an amount of 50 wt % or more and less than 90 wt % based on the total weight of a negative electrode active material and the graphite is present in an amount of 10 wt % or more and less than 50 wt % based on the total weight of the negative electrode active material, and
wherein the alkali metavanadate has a crystalline phase or an amorphous phase and a composition of Formula 1 below:

$$AVO_3 \quad (1)$$

wherein A is at least one alkali metal element of Na and K.

2. The negative electrode active material according to claim 1, wherein the amorphous alkali metavanadate is a compound or mixture of $AVO_3$ and $P_2O_5$.

3. The negative electrode active material according to claim 2, wherein the $P_2O_5$ is comprised in an amount of 1 to 30 parts by weight based on 100 parts by weight of $AVO_3$.

4. The negative electrode active material according to claim 1, wherein a charge voltage of the negative electrode active material progresses up to less than 1.5 V with respect to reduction potential of lithium ions based on a negative electrode.

5. The negative electrode active material according to claim 1, wherein a reversible capacity of the negative electrode active material is 400 mAh/g or more.

6. The negative electrode active material according to claim 1, wherein when a charge voltage of the negative electrode active material progresses up to less than 0.1 V with respect to reduction potential of lithium ions based on a negative electrode, a reversible capacity of the negative electrode active material is 400 mAh/g or more.

7. The negative electrode active material according to claim 1, wherein when a discharge voltage of the negative electrode active material progresses up to 2.5 V or more with respect to reduction potential of lithium ions based on a negative electrode, a reversible capacity of the negative electrode active material is 400 mAh/g or more.

8. The negative electrode active material according to claim 1, wherein a vanadium (V) element comprised in the negative electrode active material reversibly stores three lithium elements or more.

9. The negative electrode active material according to claim 1, wherein an average particle size of the alkali metavanadate is 1 to 30 μm.

10. The negative electrode active material according to claim 1, wherein when X-ray diffraction of the amorphous phase is measured from 10 degrees to 80 degrees at a scan rate of 1 degree/minute to 16 degrees/minute and an interval of 0.01 degrees, a ratio of signal to noise is less than 50, compared to a noise shown in a base line.

11. A lithium secondary battery comprising:
a negative electrode comprising the negative electrode active material according to claim 1;
a positive electrode comprising at least one of a lithium metal oxide or lithium metal phosphate;
a separator disposed between the negative electrode and the positive electrode; and
an electrolyte.

12. The lithium secondary battery according to claim 11, wherein the negative electrode operates in a voltage section of 0 V to 3.5 V with respect to lithium.

13. The lithium secondary battery according to claim 11, wherein, in the positive electrode, the lithium metal oxide is $LiMO_2$, where M is Co, Ni, or Mn, $Li_{1+x}Mn_{2-x}O_4$, where $0 \leq x \leq 0.3$, or $LiNi_{1-x}M_xO_2$, where M is Co, Mn, Al, Cu, Fe, Mg, B or Ga, and $0.01 \leq x \leq 0.3$, and the lithium metal phosphate is $LiMPO_4$, where M is Fe, Co, Ni, or Mn.

14. The lithium secondary battery according to claim 11, wherein, in the positive electrode, the lithium metal oxide is $LiCoO_2$, $LiNiO_2$, $LiMn_2O_4$, $Li(Ni_aMn_bCo_c)O_2$, where $a+b+c=1$, $LiNi_{0.5}Mn_{0.5}O_4$, or $LiNi_{0.5}Mn_{0.5}O_2$, and the lithium metal phosphate is $LiFePO_4$, $LiMnPO_4$, or $Li_3V_2(PO_4)_3$.

15. The lithium secondary battery according to claim 11, wherein the lithium metal oxide and lithium metal phosphate of the positive electrode are at least one of $LiNi_{0.5}Mn_{1.5}O_4$, $LiCoPO_4$, $Li_3V_2(PO_4)_3$ and $yLi_2MnO_3 \cdot (1-y)LiNi_aMn_bCo_cO_2$, where $0.2 \leq y \leq 0.8$ and $a+b+c=1$, operable at a voltage of 4.5 V or more.

16. The lithium secondary battery according to claim 11, wherein the electrolyte comprises an organic solvent and a lithium salt, the organic solvent comprises at least one of ethylene carbonate, propylene carbonate, diethyl carbonate, dimethyl carbonate, 1,2-dimethoxyethane, 1,2-diethoxyethane, γ-butyrolactone, tetrahydrofuran, 2-methyltetrahydrofuran, 1,3-dioxene, 4-methyl-1,3-dioxene, diethyl ether, and sulfolane, and the lithium salt comprises at least one of $LiClO_4$, $LiCF_3SO_3$, $LiAsF_6$, $LiBF_4$, $LiN(CF_3SO_2)_2$, $LiPF_6$, LiSCN, $LiB(C_2O_4)_2$, and $LiN(SO_2C_2F_5)_2$.

17. A method of manufacturing an electrode, the method comprising:
mixing a binder and a dispersion with a powder of the negative electrode active material according to claim 1 to prepare a paste;
spreading the paste over a current collector for an electrode; and
drying the paste at 50 to 200° C.

18. The method according to claim 17, wherein, in the preparing of the paste, a conductive material is additionally added and mixed, and the conductive material is at least one of powder type carbon black, vapor grown carbon fiber, and graphite, and is comprised in an amount of 1 to 30 parts by weight with respect to 100 parts by weight of the negative electrode active material.

19. The method according to claim 17, wherein, in the preparing of the paste, alkali metavanadate is an $AVO_3$ type, where A is at least one of Li, Na, and K, and is crystalline or amorphous.

20. The method according to claim 17, wherein the dispersion is at least one of N-methylpyrrolidone (NMP), isopropyl alcohol, acetone and water, and is comprised in an amount of 10 to 200 parts by weight with respect to 100 parts by weight of the negative electrode active material; and the binder is at least one of polytetrafluoroethylene (PTFE), polyvinylidene fluoride (PVdF), cellulose, styrene butadiene rubber (SBR), polyimides, polyacrylic acid, alkali polyacrylate, polymethyl methacrylate (PMMA), and polyacrylonitrile (PAN), and is comprised in an amount of 3 to 50 parts by weight with respect to 100 parts by weight of the negative electrode active material.

21. The method according to claim 17, wherein the current collector for the electrode is at least one of copper, aluminum, stainless, nickel, and titanium.

22. A negative electrode active material comprising alkali metavanadate, and
graphite,
wherein the alkali metavandate is present in an amount of 50 wt % or more and less than 90 wt % based on the total weight of a negative electrode active material, and the graphite is present in an amount of 10 wt % or more and less than 50 wt % based on the total weight of the negative electrode active material,
wherein the alkali metavanadate has a crystalline phase and a composition of Formula 1 below:

$$AVO_3 \qquad (1)$$

wherein A is at least one alkali metal element of Na and K, and wherein the crystalline phase is irreversibly converted into an amorphous phase during charging.

* * * * *